United States Patent

Aas

Patent Number: 5,941,009
Date of Patent: Aug. 24, 1999

[54] SHOOTING FUNNEL FOR A FISHING LINE

[75] Inventor: Reidar Aas, Tomrefjord, Norway

[73] Assignee: O. Mustad & Son A/S, Gjovik, Norway

[21] Appl. No.: 08/945,082

[22] PCT Filed: Apr. 18, 1996

[86] PCT No.: PCT/NO96/00089

§ 371 Date: Oct. 20, 1997

§ 102(e) Date: Oct. 20, 1997

[87] PCT Pub. No.: WO96/32838

PCT Pub. Date: Oct. 24, 1996

[30] Foreign Application Priority Data

Apr. 18, 1995 [NO] Norway ..................................... 951452

[51] Int. Cl.⁶ ............................ A01K 69/00; B63B 35/14
[52] U.S. Cl. .................................... 43/4; 43/4.5; 114/255
[58] Field of Search ................................. 43/4, 4.5, 27.2, 43/27.4; 114/255, 343, 179, 180, 181, 221 R

[56] References Cited

U.S. PATENT DOCUMENTS 5,165,174  11/1992  Brown, Jr. ................................. 43/6.5

FOREIGN PATENT DOCUMENTS 177031  4/1995  Norway .
1355210  11/1987  U.S.S.R. .................................... 43/4.5
634965  3/1950  United Kingdom ......................... 43/4

Primary Examiner—Michael J. Carone
Assistant Examiner—Fredrick T. French, III
Attorney, Agent, or Firm—Jacobson, Price, Holman & Stern, PLLC

[57] ABSTRACT

A device for deployment of a fishing line, wherein the line is forced below the surface of the water, characterized by a funnel-like tube or channel designated as a shooting funnel (A) provided with an upper (B) and a lower (C) pivotable attachment stay connected to the vessel's stern (D), and wherein the lower attachment stay projects further out from the vessel than the upper attachment stay, thus forming an oblique angle of 63° in relation to the surface of the water, and furthermore that the lower free end of the shooting funnel is provided with a rounded oval collar (F) which is located well below the surface of the water when in operative position, moreover that a slit (H) runs along the whole length of one side of the funnel and serves as a guiding track for ropes for grapnel and line floats when a weight (G) is attached to the outer free end of the fishing line and is thrown into the funnel drawing the line with fish hook and bait through the funnel. When the shooting funnel (A) is not in operation, it is parked alongside the vessel by means of the two pivotable stays (B, C).

3 Claims, 2 Drawing Sheets

SHOOTING FUNNEL FOR A FISHING LINE

The invention relates to a device for deploying a fishing line in the water, which device can be fitted on both old and new vessels which are engaged in line fishing.

It is common knowledge that there are special vessels which are designed and equipped for this type of fishing which do not operate exclusively along the coast, but also on the fishing banks further out at sea. In recent years a substantial number of sea-going vessels have been built which are engaged in fishing both with autolines and standard lines in distant waters. The common feature of this type of fishing is that the fish hook is baited with fish such as, for example, herring, squid or mackerel. The problem has been that when the baited line is deployed in the water, large flocks of seabirds will attack the bait. In addition to the fact that the fishing line is now kept afloat since the bird is caught in the fish hook which is holding the bait. it is a tragedy that a large number of seabirds lose their lives. This also has the result that the dead bird which is caught in the line after it is submerged in the sea will scare the fish away from the fishing line. For a number of years, therefore, various attempts have been made to find a method which prevents "attacks" of this kind by seabirds on the bait from occurring when the line is deployed in the water.

Thus a device is known in the prior art which substantially consists of an outrigger mounted on the vessel's stern or at the side of the vessel, where a rotatable arm, which guides the fishing line, is arranged to lower or raise the line in relation to the vessel. Similarly a device is known where cooperating arms are provided with pulleys with the intention of reducing tugs which occur when a line or a fishing net is pulled aboard the vessel. Furthermore Norwegian laid open patent application no. 177031 describes how a hydraulically influenced and downwardly pivotable boom steers the fishing line under the surface of the water during deployment.

In the present invention an improved system has been developed for deploying a fishing line in which the entire fishing line is now shielded as it leaves the vessel and is not deployed until it is under the surface of the water. Since the line with fish hook and affixed bait is not visible to seabirds. The result is a faster and better deployment of the fishing line. In addition to the fact that the lives of large number of birds are now spared. A much more effective fishing time is achieved and thereby an increased catch.

According to the invention this is achieved by providing a funnel-like tube or channel, designated as a shooting funnel in the subsequent description, with an upper and a lower rotatable attachment stay connected to the vessel's stern, and where the lower attachment stay projects further out from the vessel than the upper attachment stay, thus forming an oblique angle of 63° in relation to the surface of the water. In the outwardly pivoted position the lower part of the shooting funnel, which ends in a collar, will be located well below the surface of the water. A slit in one side of the shooting funnel is arranged as a guiding track for ropes for grapnel and line floats which accompany the line during deployment. When the shooting funnel is not in operation it is parked alongside the vessel by means of two pivotable stays.

The shooting funnel according to the invention is explained in more detail in connection with the attached drawing in which.

Figure 1:
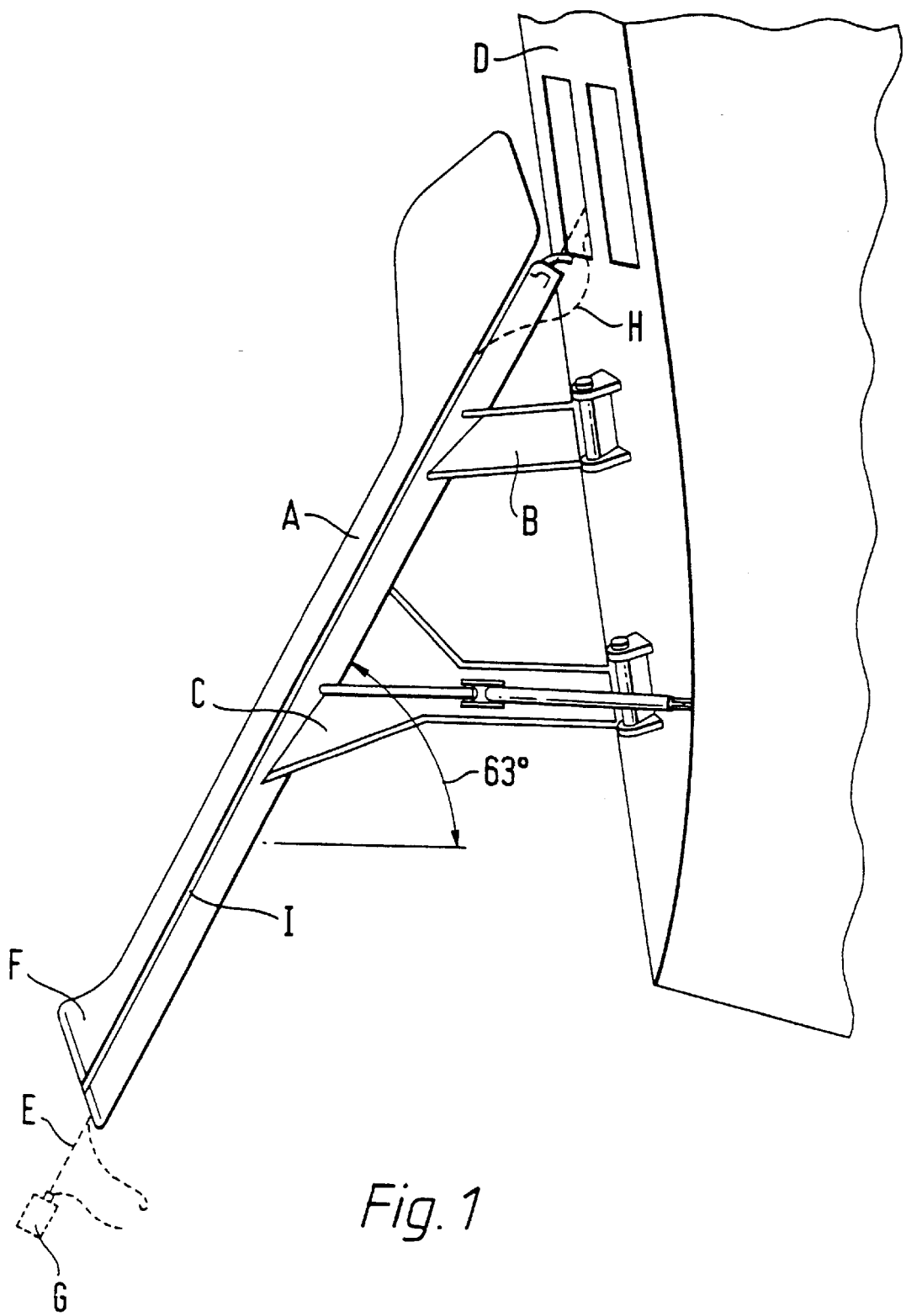
FIG. 1 is a side view of the shooting funnel in operative position mounted on to the vessel's stern.
Figure 2:
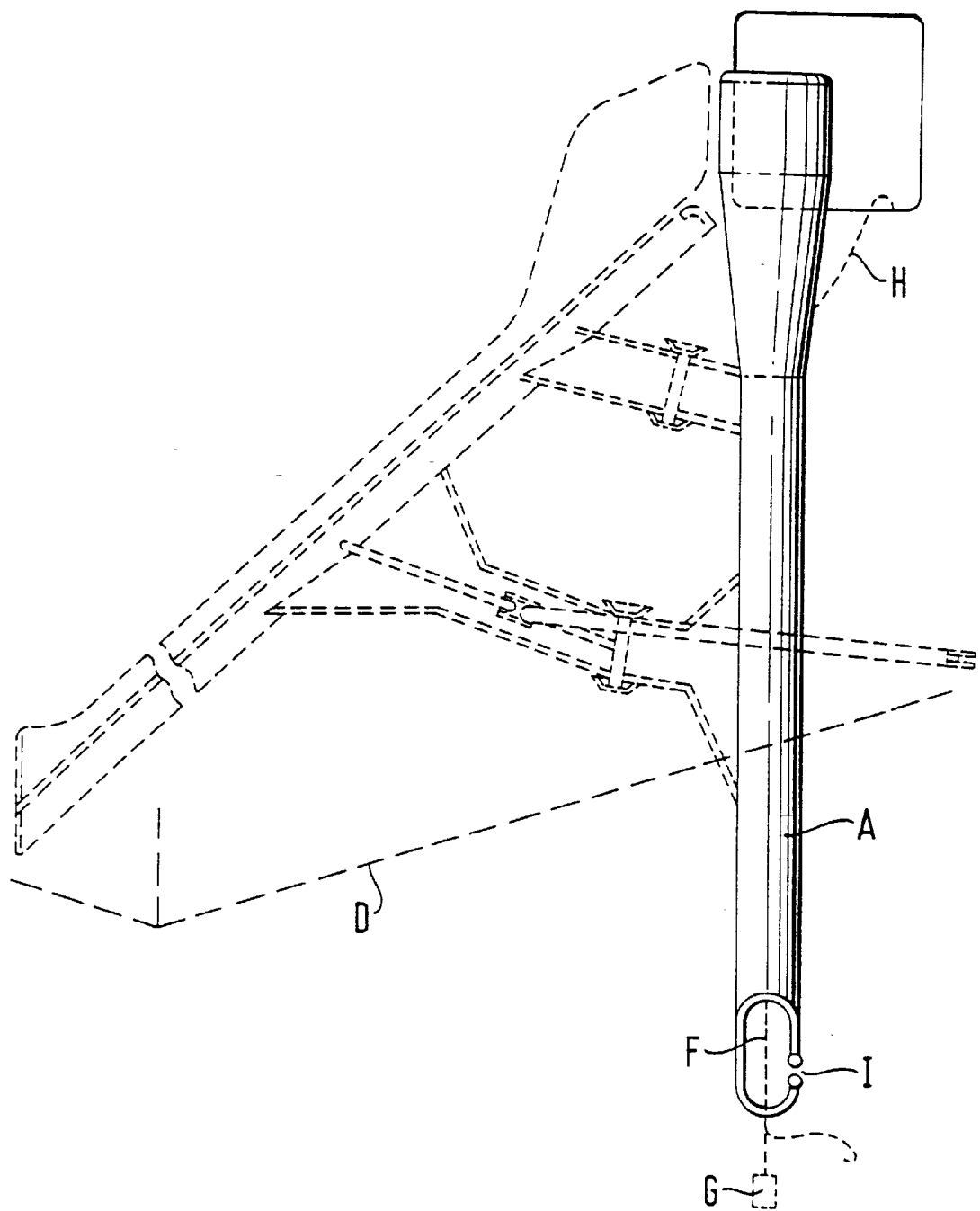
FIG. 2 is a rear view illustrating in solid lines the shooting funnel in operative position, and in dotted lines pivoted in towards the vessel.

The shooting funnel A is connected to an upper B and a lower C attachment stay rotatably connected to the vessel's stem D. In order to improve its ability to pick up the fishing line E, the lower free end of the shooting funnel ends in a rounded oval collar F. A weight G is connected to the line's outer free end and causes the line to attain sufficient speed during deployment. As a guiding track for ropes H for grapnel and line floats, one side of the shooting funnel is provided with a slit I which runs for the whole length of the shooting funnel.

When the fishing line is deployed the weight, which is connected to the line's outer free end, is thrown into the shooting funnel and draws with it the line with fish hook and bait through the funnel. The outer free end of the funnel, which is located well below the surface of the water when in operative position, now puts the line out into the water without any part of the line with fish hook and bait being visible to seabirds. The slit which is provided on the side of the funnel now acts as a guiding track for ropes which carry grapnel and line floats. The guiding track guides the ropes with grapnel and line floats on the outside of the funnel while the actual fishing line runs on the inside.

I claim:

1. A device for deploying a fishing line of the type where the line is forced under the surface of the water, said device comprising:
    a channel provided with an upper and a lower rotatable attachment stay connectable to a vessel's stern, and the lower attachment stay projects further out from the vessel than the upper fitting, thus forming an oblique angle of 63° in relation to the surface of the water, and a lower free end of the channel being provided with a rounded oval collar which will be located below the surface of the water when in an operative position.

2. A device according to claim 1, wherein a slit which runs on one side and along the whole length of the channel and serves as a guiding track for ropes for grapnel and line floats when a weight is attached to the outer free end of the fishing line and is thrown into the channel drawing the line with fish hooks and bait through the channel.

3. A device according to claim 1, wherein when the channel is not in operation, it is capable of being parked alongside the vessel by means of the two pivotable stays.

* * * * *